United States Patent [19]

Brantmark et al.

[11] Patent Number: 4,553,077
[45] Date of Patent: Nov. 12, 1985

[54] INDUSTRIAL ROBOT

[75] Inventors: Håkan Brantmark, Västerås; Johan Ennerfelt, Växjö, both of Sweden

[73] Assignee: ASEA Aktiebolag, Västerås, Sweden

[21] Appl. No.: 508,976

[22] Filed: Jun. 29, 1983

[30] Foreign Application Priority Data

Jun. 29, 1982 [SE] Sweden .............................. 82040007

[51] Int. Cl.⁴ .......................................... G05B 19/00
[52] U.S. Cl. .................................. 318/568; 318/567; 318/569; 219/125.1; 901/2; 901/9; 901/46
[58] Field of Search ............... 318/560, 565, 567, 568, 318/569; 219/124.34, 124.40, 125.10; 364/478, 513, 174, 190, 474; 901/2, 9, 46, 50

[56] References Cited

U.S. PATENT DOCUMENTS

| | | | |
|---|---|---|---|
| 3,744,032 | 7/1973 | Engelberger et al. | 901/22 X |
| 3,909,600 | 9/1975 | Hohn | 364/513 |
| 4,011,437 | 3/1977 | Hohn | 364/478 X |
| 4,140,953 | 2/1979 | Dunne | 318/632 X |
| 4,178,632 | 12/1979 | Anthony | 901/9 X |
| 4,224,501 | 9/1980 | Lindbom et al. | 219/125.1 X |
| 4,280,137 | 7/1981 | Ashida et al. | 219/124.34 X |
| 4,347,578 | 8/1982 | Inaba | 364/513 |
| 4,360,886 | 11/1982 | Kostas et al. | 318/568 X |
| 4,380,696 | 4/1983 | Masaki | 219/125.1 X |
| 4,432,063 | 2/1984 | Resnick | 364/474 X |
| 4,445,022 | 4/1984 | Mori | 219/125.1 |

FOREIGN PATENT DOCUMENTS 0075325 3/1983 European Pat. Off. ............ 318/568

*Primary Examiner*—William M. Shoop, Jr.
*Assistant Examiner*—Shik Luen Paul Ip
*Attorney, Agent, or Firm*—Pollock, Vande Sande & Priddy

[57] ABSTRACT

An industrial robot has a control system with a program memory. During programming, the robot is manually controlled to a sequence of desired positions. At each position, an operating member may be activated to store into the program memory an instruction containing both information about the robot position and information about robot operation at that position.

Suitably information about robot operation is entered in the form of identification of a sub-program containing a set or sequence of control signals which have been stored in advance. The sub-program is suitably identified by a number fetched from a buffer memory. For each of the instructions, during the execution of the main program, on the one hand the positioning of the robot is executed and, on the other hand, the sub-program is called and executed.

4 Claims, 3 Drawing Figures

INDUSTRIAL ROBOT

BACKGROUND OF THE INVENTION

1. Field of the Invention

This invention relates to an industrial robot control system for controlling the positioning of a robot to a number of programmed operating positions and the execution of programmed operations in association with these operating positions.

2. Description of the Prior Art

In certain robot applications, the robot has to perform a certain work operation at each one of a number of points or locations. This is typically the case, for example, with robots which are used for spot welding. In such a case the robot hand supports a spot welding gun, and the welding process is controlled by a so-called welding control unit connected to the welding gun. The welding control unit is provided with a number of inputs, and, by applying suitable signals at these inputs, the desired welding parameters, for example current intensity and welding time, can be set. During programming of a robot of this kind, the robot is moved to and positioned at each one of the desired welding locations. Then, in the program memory of the robot, there are stored a series of positioning instructions which, during execution of the program, control movement of the robot from welding location to welding location. In addition, in the instruction for each location in the program memory, there must also be stored information stating that a weld is to be carried out and determining the desired welding parameters. A work cycle of the robot often comprises a large number of welding points or locations, and usually the same welding parameters are valid for a sequence of these points. The instruction parts, which define the welding parameters, must then be programmed into each of the welding points, for example by means of pushbuttons on a control unit. For this purpose a relatively large number of depressions of buttons or the like at each welding point is required and the programming work therefore becomes time-wasting.

The above-mentioned problem is, of course, not limited only to spot welding robots but arises generally during the programming of robots, where similar sequences or sets of control signals must be programmed a plurality of times for each work cycle of the robot.

It is of great economical and practical importance that the flexibility of the robot can be utilized to the greatest possible extent by allowing the programming and reprogramming of the robot to be carried out in as simple and fast a manner as possible.

SUMMARY OF THE INVENTION

The present invention aims to provide an industrial robot control system which makes possible a simple and fast programming of a work cycle involving a sequence of mutually identical work operations.

According to the present invention an industrial robot control system for controlling the positioning of a robot to a number of programmed operating positions and the execution of programmed operations in association with these operating positions, comprising: first control means for input during programming of information concerning robot operation; memory means for storing information fed in via the first control means during programming, and; second control means for controlling the robot during automatic operation in accordance with the information stored into the memory means; is characterized in that the first control means comprises a control member arranged, when activated during programming, to cause storage in the memory means of, on the one hand, information for controlling the robot and, on the other hand, information for controlling one of said operations.

BRIEF DESCRIPTION OF THE DRAWINGS

An embodiment of the invention will now be described by way of example, and in greater detail, with reference to the accompanying drawings, in which.

DESCRIPTION OF THE PREFERRED EMBODIMENTS

Figure 1:
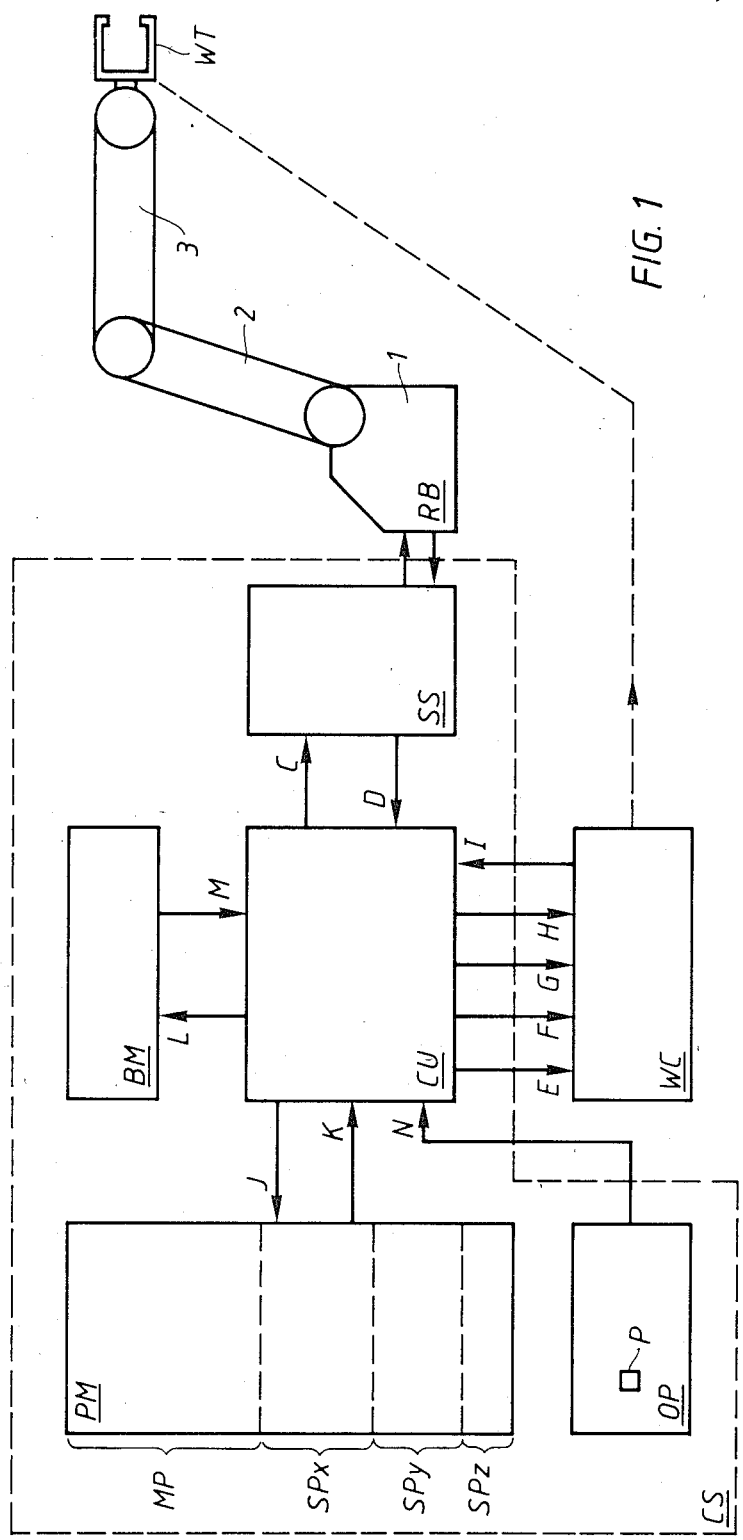
FIG. 1 shows schematically an example of an industrial robot control system according to the invention.

FIG. 1 shows an industrial robot RB, for example of anthropomorphous type. The robot RB has a fixed or rotatable base plate 1 which carries a lower arm 2 which is rotatable about a horizontal axis. The lower arm 2 carries an upper arm 3 which is rotatable about a horizontal axis extending through an upper portion of the arm 2. At the outer end portion of the arm 3 there is attached a so-called robot "hand", which is controllable in one or more degrees of freedom relative to the arm 3. The hand supports a spot welding gun WT. A welding control unit WC is connected to the spot welding gun for controlling a welding process. The welding control unit has a number of digital inputs E, F, G, H, to which are fed, from a control system CS of the robot, signals defining welding parameters. The welding control unit WC controls the welding process, i.e. the switching on and off of the mechanical welding force, of the welding current, etc., in accordance with parameters defined by the signals E, F, G and H. The signals transmitted from the control system CS of the robot to the welding control unit also contain information which starts the welding procedure. When this procedure is completed, the welding control unit WC supplies an indicating signal I to the control system CS of the robot.

The control system CS comprises a central unit CU, a servo-system SS of the robot, an operating unit OP, a program memory PM and a buffer memory BM. The central unit CU may include, for example, a microprocessor controlling the working of the control system. The control unit CU emits control signals C to the servo-system SS of the robot, the servo-system SS including drive members for drive motors which control the movements in the different axes of the robot. From transducers mounted on the robot RB, feedback signals D are obtained via the servo-system SS, the feedback signals at each moment indicating the position of the robot.

The operating unit OP includes operating members (not shown) for controlling the position or speed of the robot during the programming work, and operating members for input of the desired instructions into the robot program. For control of the movement and position of the robot, there can suitably be used a joystick having three degrees of freedom. For input of other instructions there may be arranged a set of pushbuttons.

The signals from the operating unit OP to the central unit CU are designated N in FIG. 1.

In the program memory PM there can be stored, on the one hand, a main program MP and, on the other hand, a number of sub-programs SPx, SPy and SPz. The information which is stored into the memory and the signals which control the output are sent from the central unit CU to the memory in the form of signals designated J in FIG. 1, whereas signals K designate the information read out from the memory.

Information can be entered into the buffer memory BM in the form of signals L and can be read out from the buffer memory BM in the form of signals M.

In each of the sub-programs SPx-SPy (the number of which are provided in the program memory PM is arbitrary), there is stored a certain set of welding parameters. When calling a certain sub-program, the signals E-H assume values which define the welding parameters stored in the sub-program. The sub-programs are stored in advance, either by the robot supplier or by the user. Each sub-program is provided with a number, or the like, which identifies the particular sub-program.

The main inventive feature of the control system is the provision in the operating unit OP of an operating member P, for example a pushbutton, which is intended to be used during the programming of the welding program of the robot and whose function is described in more detail in the following. The operating member P may have a "fixed function" designated by a fixed marking or text, for example "START" or "PROCESS". Alternatively, however, the operating member P may be a so-called "multi-function" or "variable-function" button, which, with the aid of other operating members, may be assigned with any one of a number of different functions. In this latter case the operating member P is suitably provided with suitable indicating means, for example in the form of an alphanumeric display which, in plain language or by a suitable abbreviation, indicates the current function of the operating member P.

Figure 2:
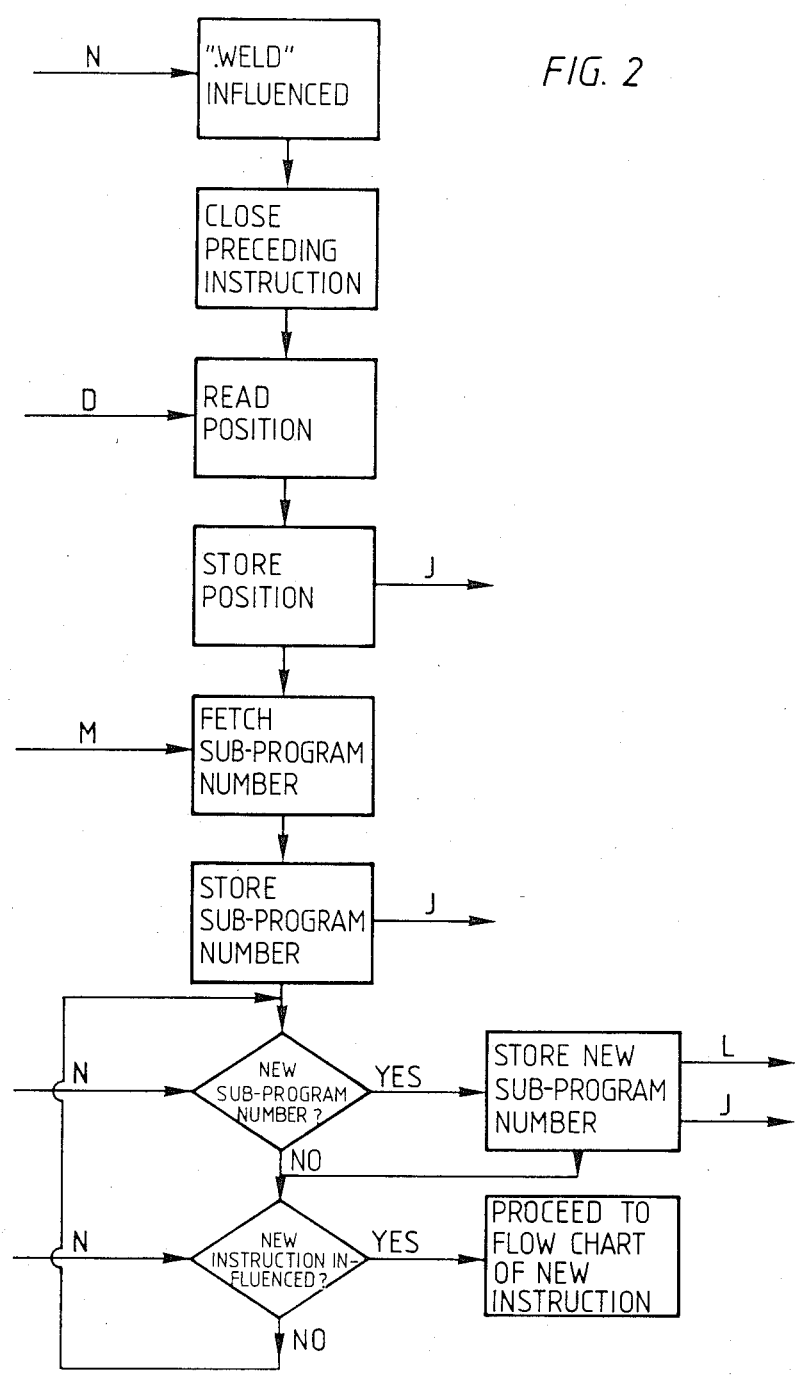
FIG. 2 shows the function of the control system of FIG. 1 during programming.

The mode of operation of the control system during programming of the robot will now be described with reference to FIG. 2. The robot is first positioned at a desired welding point (i.e. the working point of the spot welding gun is caused to assume a desired position and also the robot hand and thus the spot welding gun are brought to a desired orientation in space). When the robot positioning is terminated, the operating member P is activated, e.g. the pushbutton is depressed-in the following it is assumed that the operating member has the designation "WELD". The signal N to the control unit CU then causes the preceding instruction in the program memory PM to be considered completed, and the input of the next instruction into the program memory is started. In this instruction, the robot position, which is obtained from the different shaft transducers of the robot is first read in and is transmitted to the central unit CU in the form of signals D. In the buffer memory BM there is stored a sub-program number, and this sub-program number is now fetched from the buffer memory BM and is stored into the current instruction in the program memory. The robot operator now has the possibility, if desired, to choose a new sub-program. This may, for example, be done quite simply by registering on a digital key set a two-digit combination of figures which defines the new sub-program. The central unit now senses whether a new sub-program number has been fed in. If this is the case, this number is stored in the current instruction in the program memory and also in the buffer memory BM. Thereafter, the central unit continues to the next point in the flow diagram (if a new sub-program number has not been fed in by the operator, the central unit proceeds directly to this next point). The central unit CU now senses whether a new instruction has been ordered with the aid of an operating pushbutton on the control unit. As long as this is not the case, the control system assumes an idle position in the loop shown in the flow diagram of FIG. 2. For programming of the next welding point into the program, the robot is moved to this point, and the operating member P, e.g. the pushbutton "WELD", is influenced, whereby the control system repeats the operating sequence described above and shown in FIG. 2.

This implies that a sequence of welding points with the same welding parameters can be programmed in the simplest possible way by controlling the robot to point after point and activating the operating member P, e.g. depressing the pushbutton "WELD", at each point. Only at the first welding point, and in the case of any replacement of the welding parameters, does a sub-program number have to be stored. In this way, the programming can be carried out considerably more rapidly than has been possible with prior art control systems.

Figure 3:
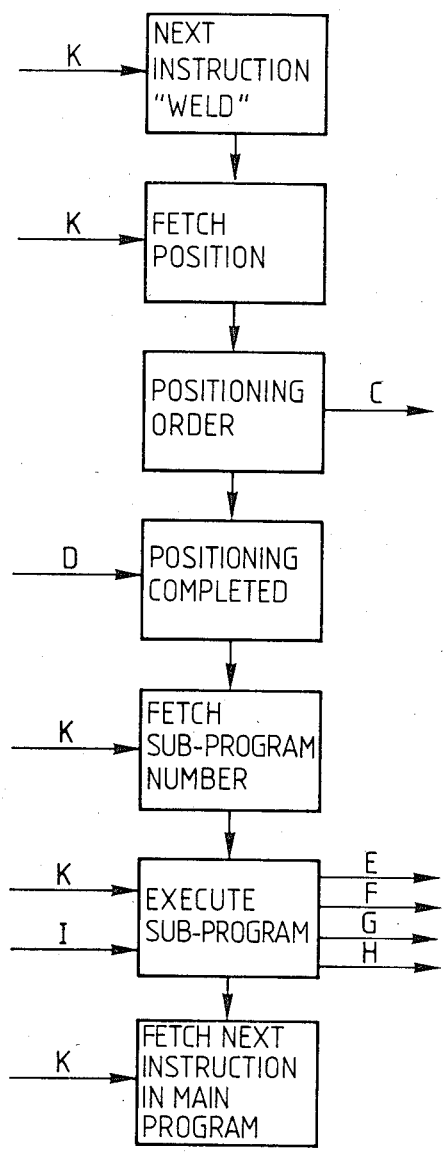
FIG. 3 shows the function of the control system of FIG. 1 during execution of the program.

FIG. 3 shows schematically the function of the control system during automatic operation, i.e. when executing the program stored into the robot. When, during running of the main program, the robot reaches an instruction which, in addition to a positioning instruction, contains the instruction "WELD", the control system proceeds according to FIG. 3. Firstly, the position information stored in the instruction is read and an order is given to the control system SS which positions the robot into this position. When positioning is completed, i.e. when the robot has reached the desired position, this is indicated by a signal D to the central unit CU. The central unit CU then fetches from the program memory PM the sub-program number stored in the instruction in question. Thereafter, this sub-program is called and executed, i.e. the welding parameters are set in the welding control unit by means of the signals E-H and the welding process is carried out. When the sub-program has been completed, i.e. when the welding process is completed, this is indicated by the signal I from the welding control unit WC to the central unit CU. The central unit CU then takes one step forward in the program memory and fetches the next instruction.

In addition to information about the welding parameters, it is also possible to program the desired number of welding points in the sub-programs.

As will be clear from the above, the programming of a welding point only requires—besides the positioning of the robot—the activation, e.g. depression, of one single operating member (P). In those cases where this operating member may have several different functions, it may, however, be required that the function in question is first selected with the aid of another operating member. However, this does not reduce the advantages obtainable with a control system according to the invention.

The invention has been described in the foregoing in conjunction with a robot employed for spot welding. However, the invention can be used for a great number of other applications, for example for arc welding, for laying out a string of glue, for assembly of a number of similar parts at a plurality of points. In the foregoing it has also been described how, in each instruction, the positioning of the robot is first carried out and thereafter how the work operation (the welding) is carried out. In other applications, it may be suitable for the work process to be carried out prior to the positioning, or simultaneously therewith.

The invention can generally be applied to the programming of work cycles which comprise a sequence of repetitive operations, which can be executed either—as described above—by external equipment or by the robot's own members. An example of the latter case is the above-mentioned assembly. Another example is the so-called pattern feature, i.e. the placement of a number of objects in a certain pattern, for example loading of a pallet (palletizing). In the latter case, the robot is controlled to each one of the points at which an object shall be placed, and at each point the control member described above is activated. Thereby there are programmed in the current instruction in the program memory, on the one hand, information about the position of the point and, on the other hand, an order to call a sub-program which controls the robot to pick up an object and place it in the programmed position. Possibly, the position of each point need only be approximately indicated by controlling the robot to an approximate position. The sub-program can then comprise instructions for positioning the object in the exact position with the aid of sensors, for example of optical or force-sensing type.

What is claimed is:

1. In an industrial robot control system for controlling the positioning of a robot to a number of programmed operating positions and the execution of programmed operations in association with these operating positions, the control system comprising:

first control means for positioning, during programming, the robot successively to said operating positions and for storing, at each operating position, information for positioning the robot to that operating position and information for controlling an operation to be carried out in association with that operating position, first memory means for storing information fed in via the first control means during programming, said information comprising a main program with a sequence of instructions which, during automatic operation of the robot, are successively executed; and second control means for controlling the robot during automatic operation in accordance with the information stored in said first memory means;

the improvement wherein:

the control system comprises second memory means for storing information defining a sub-program, which contains information for control of one of said operations;

the first control means comprising an operating member arranged, upon a single activation during programming with the robot at an operating position, to cause storage in the first memory means of an instruction which, during automatic operation causes positioning of the robot to that operating position as well as calling for an execution of said sub-program.

2. An industrial robot control system according to claim 1, wherein the said sub-program consists of one of a plurality of sub-programs stored in advance in the first memory means.

3. An industrial robot control system according to claim 1, comprising external equipment means arranged to execute said operations.

4. An industrial robot control system according to claim 3, wherein the second control means is connected to the external equipment means.

* * * * *